(12) United States Patent
Wu (10) Patent No.: US 8,756,425 B2
(45) Date of Patent: Jun. 17, 2014

(54) DATA SECURITY AUTHENTICATION SYSTEM AND RELATED MULTI-FUNCTION MEMORY CARD AND COMPUTER PROGRAM PRODUCT

(75) Inventor: Jiann Dong Wu, Taipei (TW)

(73) Assignee: Jrsys International Corp., Taipei (TW)

( * ) Notice: Subject to any disclaimer, the term of this patent is extended or adjusted under 35 U.S.C. 154(b) by 33 days.

(21) Appl. No.: 13/555,569

(22) Filed: Jul. 23, 2012

(65) Prior Publication Data

US 2013/0055412 A1 Feb. 28, 2013

(30) Foreign Application Priority Data

Aug. 26, 2011 (TW) .............................. 100130614 A (51) Int. Cl.
*H04L 29/06* (2006.01)
*G06F 21/00* (2013.01)

(52) U.S. Cl.
USPC ................................. 713/172; 726/9; 726/20

(58) Field of Classification Search
None
See application file for complete search history.

(56) References Cited

U.S. PATENT DOCUMENTS

2012/0102337 A1* 4/2012 Grobbel et al. ............... 713/193

FOREIGN PATENT DOCUMENTS

| TW | M288420 | 3/2006 |
| TW | M288702 | 3/2006 |
| TW | M318764 | 9/2007 |
| TW | 200924479 | 6/2009 |
| TW | 201003574 | 1/2010 |

* cited by examiner

*Primary Examiner* — Izunna Okeke
(74) *Attorney, Agent, or Firm* — Birch, Stewart, Kolasch & Birch, LLP (57) ABSTRACT

A multi-function memory card is disclosed including: a memory card interface for coupling with a memory card connection port of a terminal device; a storage module for storing one or more specific files transmitted from the terminal device; a protocol converter for retrieving the one or more specific files from the storage module and extracting data contained in the one or more specific files; and a smart card module for conducting an operation on extracted data from the protocol converter using a private key to generate one or more response data and transmitting the one or more response data to the protocol converter; wherein the protocol converter converts the one or more response data into one or more response files and writes the one or more response files into the storage module so that the one or more response files are accessible by the terminal device.

15 Claims, 8 Drawing Sheets

DATA SECURITY AUTHENTICATION SYSTEM AND RELATED MULTI-FUNCTION MEMORY CARD AND COMPUTER PROGRAM PRODUCT

CROSS-REFERENCE TO RELATED APPLICATIONS

This application claims the benefit of priority to Taiwanese Patent Application No. 100130614, filed on Aug. 26, 2011; the entirety of which is incorporated herein by reference for all purposes.

BACKGROUND

The present disclosure generally relates to data communication mechanism between a smart card module and a terminal device and, more particularly, to a data security authentication system and related multi-function memory card and computer program product.

A smart card is made by embedding a smart card module in a plastic card. The smart card module can be realized by IC circuit, and thus the smart card is very thin, compact, and convenient to carry. In addition, since the smart card is difficult to fake, it may provide merits in security, such as authentication, integrity, privacy, and non-repudiation, when adopting a public key infrastructure (PKI). Accordingly, the smart card can be applied in many security fields, such as data transmission and transaction verification.

According to traditional data communication protocol between the smart card module of the smart card and a terminal device (e.g., a computer), a smart card reader is required for exchanging data between the smart card module and the terminal device. However, the smart card reader is not a standard built-in device for most computers due to the hardware cost concern. The smart card reader is typically connected to the terminal device via a USB connection port, but different smart card readers require different driver programs. Furthermore, the same smart card reader may require different versions of driver program when operating under different operating systems. Above restrictions cause inconvenience to the use of smart cards, and result in severe obstacle in the developing and promotion of the smart cards.

Nowadays, more and more terminal devices, such as mobile phones, notebook computers, and tablet computers, are designed to be more compact and portable. Under this situation, it is not realistic to demand the users to carry a USB smart card reader all the time so as to access the smart card when needed. Moreover, due to design consideration or volume restriction, some terminal devices even omit the USB connection ports, and there is not even possible for some terminal devices to have a built-in smart card reader. In the above development trend of terminal devices, the traditional smart card would inevitably become more inconvenient in use or even unusable.

SUMMARY

In view of the foregoing, it can be appreciated that a substantial need exists for apparatus that can improve the data communication between a smart card module and a terminal device and increase the compatibility and utilization convenience of the smart card module.

An example embodiment of a data security authentication system is disclosed comprising: a terminal device comprising: a memory card connection port; and a processor module, coupled with the memory card connection port, for converting one or more data into one or more specific files and writing the one or more specific files into a storage module via the memory card connection port; and a multi-function memory card comprising: a memory card interface for coupling with the memory card connection port; the storage module, coupled with the memory card interface, for storing the one or more specific files; a protocol converting circuit, coupled with the storage module, for retrieving the one or more specific files from the storage module and extracting data in the one or more specific files; and a smart card module, coupled with the protocol converting circuit, for conducting an operation on extracted data from the protocol converting circuit using a private key to generate one or more response data and transmitting the one or more response data to the protocol converting circuit; wherein the protocol converting circuit converts the one or more response data into one or more response files and writes the one or more response files into the storage module, then the processor module reads the one or more response files from the storage module via the memory card connection port and extracts the response data contained in the one or more response files.

An example embodiment of a multi-function memory card is disclosed comprising: a memory card interface for coupling with a memory card connection port of a terminal device; a storage module, coupled with the memory card interface, for storing one or more specific files transmitted from the terminal device when the memory card interface is coupled with the memory card connection port; a protocol converting circuit, coupled with the storage module, for retrieving the one or more specific files from the storage module and extracting data in the one or more specific files; and a smart card module, coupled with the protocol converting circuit, for conducting an operation on extracted data from the protocol converting circuit using a private key to generate one or more response data and transmitting the one or more response data to the protocol converting circuit; wherein the protocol converting circuit converts the one or more response data into one or more response files and writes the one or more response files into the storage module so that the one or more response files are accessible by the terminal device.

An example embodiment of a computer program, stored in a non-transitory computer readable medium, enabling a terminal device to perform data communication operation with a smart card module via a memory card connection port is disclosed. The data communication operation comprises: converting one or more data to be transmitted to the smart card module into one or more specific files; writing the one or more specific files into a storage module of a multi-function memory card via the memory card connection port; retrieving a response file from the storage module via the memory card connection port; and extracting response data contained in the response file, wherein the response data is generated by the smart card module using a private key.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Figure 1:
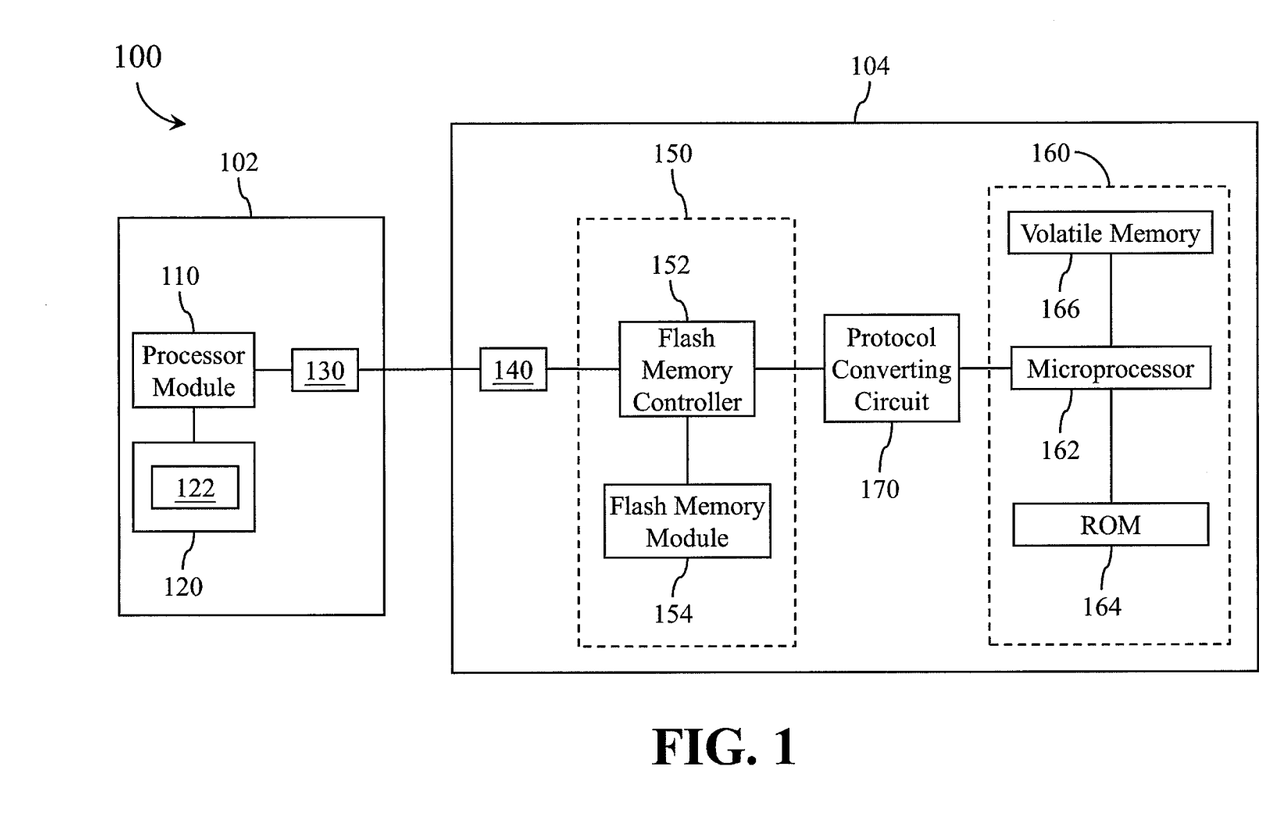
FIG. 1 is a simplified functional block diagram of a data security authentication system according to an example embodiment.

Please refer to FIG. 1, which shows a simplified functional block diagram of a data security authentication system 100 according to an example embodiment. The data security authentication system 100 comprises a terminal device 102 and a multi-function memory card 104. The terminal device 102 comprises a processor module 110, a non-transitory storage medium 120 (such as a volatile or non-volatile memory), and a memory card connection port 130, wherein the storage medium 120 and the memory card connection port 130 are coupled with the processor module 110. The processor module 110 may comprise one or more processors. For illustrative purpose, other functional blocks within the terminal device 102 are not shown in FIG. 1. In implementations, the terminal device 102 may be any kind of portable terminal device, such as a mobile phone, a notebook computer, a tablet computer, an e-book, or a GPS device, or may be a desktop computer or a vehicle electronic system.

The multi-function memory card 104 comprises a memory card interface 140 (such as a SD interface, a SDHC interface, a Mini-SD interface, a Micro-SD interface, a Compact Flash interface, a Memory Stick interface, or a xD-Picture interface), a storage module 150, a smart card module 160, and a protocol converting circuit 170 coupled between the storage module 150 and the smart card module 160. In the embodiment of FIG. 1, the storage module 150 is implemented by a flash memory, and comprises a flash memory controller 152 and a flash memory module 154. The flash memory controller 152 is coupled with the memory card interface 140, the flash memory module 154, and the protocol converting circuit 170, for controlling the accessing of the flash memory module 154.

The smart card module 160 comprises a microprocessor 162, a read-only memory 164, and a volatile memory 166. The read-only memory 164 is utilized for storing a private key and a card operation system (COS) for controlling the smart card module 160. In operations, the microprocessor 162 executes the COS in the read-only memory 164 to control and manage the operations of the smart card module 160, and utilizes the volatile memory 166 to temporarily store data needed. The read-only memory 164 may comprise one or more memory devices, such as PROM, EPROM, EEPROM, or flash memory. Some of the memory devices of the read-only memory 164 may be programmable by the microprocessor 162 so that the private key stored in the read-only memory 164 may be re-generated or changed by the microprocessor 162 as needed. For the sake of brevity, other functional blocks of the storage module 150 and the smart card module 160 are not shown in FIG. 1.

As compared to the case of smart cards, memory cards are widely used in many applications, and thus the terminal device 102 is typically built-in or pre-stored with a general driver program of memory cards. In addition, the storage medium 120 of the terminal device 102 is also stored with a computer application program 122. The computer application program 122 is not the driver program of smart card readers. In this embodiment, the computer application program 122 is utilized for handling data exchange and file conversions between the terminal device 102 and the storage module 150. For example, the computer application program 122 converts data, which is generated by the terminal device 102 and intended to be received by the smart card module 160, into files in appropriate format, and then writes the converted files to the storage module 150 of the multi-function memory card 104 via the memory card connection port 130. The computer application program 122 can also extract data, which is generated by the smart card module 160 and intended to be received by the terminal device 102, from one or more specific files stored in the storage module 150.

The protocol converting circuit 170 of the multi-function memory card 104 is utilized for handling data exchange and file conversions between the storage module 150 and the smart card module 160. For example, the protocol converting circuit 170 may extract data, which is generated by the terminal device 102 and intended to be received by the smart card module 160, from specific files that the terminal device 102 wrote into the storage module 150, and then transmit extracted data to the smart card module 160. In addition, the protocol converting circuit 170 may convert data, which is generated by the smart card module 160 and intended to be received by the terminal device 102, into files in appropriate format, and then write the converted files into the storage module 150 so that the converted files is accessible by the terminal device 102.

With the cooperation of the computer application program 122 and the protocol converting circuit 170, the terminal device 102 is enabled to communicate data with the smart card module 160 of the multi-function memory card 104 via the memory card connection port 130, without installing the driver program of the smart card module 160. The operations of the data security authentication system 100 will be described further with reference to FIG. 2.

Figure 2:
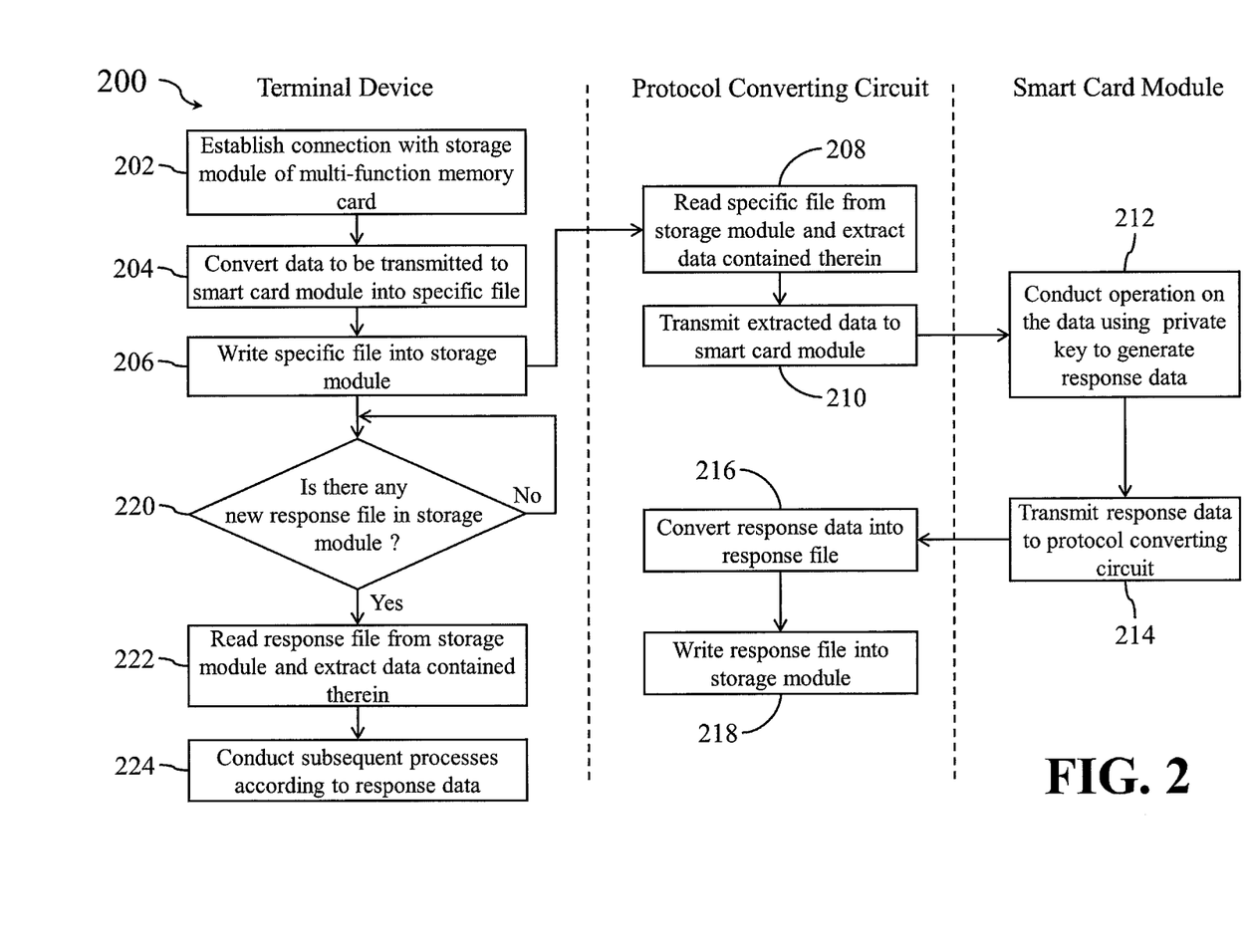
FIG. 2 is a simplified flowchart illustrating a method for communicating data between a smart card module and a terminal device in accordance with a first example embodiment.

FIG. 2 is a simplified flowchart 200 illustrating a method for communicating data between the smart card module 160 and the terminal device 102 in accordance with a first example embodiment. The left portion of the flowchart 200 are operations to be performed by the terminal device 102, the middle portion of the flowchart 200 are operations to be performed by the protocol converting circuit 170, and the right portion of the flowchart 200 are operations to be performed by the smart card module 160. The same arrangement applies to other flowcharts to be described later.

When the memory card interface 140 of the multi-function memory card 104 is connected to the memory card connection port 130 of the terminal device 102, the terminal device 102 performs operation 202 to establish connections with the storage module 150 of the multi-function memory card 104 and conduct a device initiation procedure by executing the built-in driver program. Accordingly, the computer application program 122 in the terminal device 102 needs not to act as the driver program of the memory card 104. When the memory card interface 140 is connected to the memory card connection port 130, the processor module 110 of the terminal device 102 executes the computer application program 122 to enable the terminal device 102 to perform other operations in the left portion of the flowchart 200.

In implementations, the computer application program 122 may be pre-stored in the flash memory module 154 of the storage module 150. When the memory card interface 140 of the multi-function memory card 104 is connected to the memory card connection port 130 of the terminal device 102, the computer application program 122 may be automatically loaded to and executed by the processor module 110 of the terminal device 102 so as to enable the terminal device 102 to perform other operations in the left portion of the flowchart 200.

In operation 204, the processor module 110 executes the computer application program 122 to convert one or more data to be transmitted to the smart card module 160, such as transaction data, identification authentication request, or other commands, into one or more specific files each having a predetermined filename and/or extension.

In operation 206, the processor module 110 writes the one or more specific files into the storage module 150 of the multi-function memory card 104 via the memory card connection port 130 and the memory card interface 140. In operation, the accessing of the flash memory module 154 is controlled by the flash memory controller 152. When the terminal device 102 requests to write a file into the storage module 150, the flash memory controller 152 checks whether the file has the predetermined filename and/or extension described previously. If the file has the predetermined filename and/or extension, the flash memory controller 152 records the file in a specific physical address of the flash memory module 154. If the file does not have the predetermined filename and/or extension, the flash memory controller 152 records the file in other physical addresses of the flash memory module 154.

Accordingly, the flash memory controller 152 of this embodiment only needs to check the filename and/or extension of the file that the terminal device 102 are requesting to write, and needs not to further examine the content or header of the file.

In one embodiment, each time the flash memory controller 152 records a file in the flash memory module 154, the flash memory controller 152 notifies the protocol converting circuit 170 of the physical address of the recorded file. When the protocol converting circuit 170 receives the physical address from the flash memory controller 152, the protocol converting circuit 170 checks whether the physical address is the specific physical address. If the protocol converting circuit 170 finds that the currently received physical address is not the specific physical address, it determines that the file the processor module 110 wrote to the flash memory module 154 this time does not contain any communication protocol data to be transmitted to the smart card module 160. Thus, the protocol converting circuit 170 would not read the file stored in the physical address via the flash memory controller 152.

On the contrary, if the protocol converting circuit 170 finds that the currently received physical address is the specific physical address, it determines that the file the processor module 110 wrote to the flash memory module 154 this time is a specific file containing communication protocol data generated by the terminal device 102 and intended to be received by the smart card module 160. In such case, the protocol converting circuit 170 performs operation 208 to send a read request to the flash memory controller 152 to retrieve the specific file stored in the specific physical address from the storage module 150, and then extracts data contained in the specific file.

In another embodiment, the flash memory controller 152 notifies the protocol converting circuit 170 of the physical address of the recorded file only if the flash memory controller 152 records the file in the specific physical address of the flash memory module 154. In this case, once the protocol converting circuit 170 receives the physical address from the flash memory controller 152, the protocol converting circuit 170 determines that the file the processor module 110 wrote to the flash memory module 154 this time contains communication protocol data generated by the terminal device 102 and intended to be received by the smart card module 160, and then proceeds to the operation 208.

As can be seen from the foregoing descriptions, according to the physical address transmitted from the flash memory controller 152, the protocol converting circuit 170 is capable of determining whether the file the processor module 110 wrote to the flash memory module 154 this time is the specific file containing communication protocol data generated by the terminal device 102 and intended to be received by the smart card module 160. Obviously, the protocol converting circuit 170 needs not to check the content or header of every file wrote to the flash memory module 154 by the processor module 110. As a result, the computing resource required for the protocol converting circuit 170 to achieve the above determination is very low.

Then, the protocol converting circuit 170 performs operation 210 to transmit extracted data to the smart card module 160.

When the microprocessor 162 of the smart card module 160 receives the data transmitted from the protocol converting circuit 170, the microprocessor 162 performs operation 212 to conduct an operation on the data transmitted from the terminal device 102 using a private key stored in the read-only memory 164 to generate one or more response data, such as transaction data or digital signatures.

Then, the smart card module 160 performs operation 214 to transmit the one or more response data to the protocol converting circuit 170.

As can be seen from the foregoing descriptions, the smart card module 160 regards the protocol converting circuit 170 as a terminal device and communicates data with the protocol converting circuit 170, instead of directly communicates data with the terminal device 102.

In operation 216, the protocol converting circuit 170 converts the one or more response data transmitted from the smart card module 160 into one or more response files that can be recognized by the computer application program 122. For example, the protocol converting circuit 170 may convert the one or more response data into a response file having a predetermined filename and/or extension.

In operation 218, the protocol converting circuit 170 writes the response file into the storage module 150 via the flash memory controller 152. In this embodiment, the flash memory controller 152 writes the response file transmitted from the protocol converting circuit 170 into the flash memory module 154.

In the embodiment of FIG. 2, the processor module 110 of the terminal device 102 intermittently performs operation 220 after the operation 206. The processor module 110 may periodically or aperiodically examine the content stored in the storage module 150 of the multi-function memory card 104 to detect whether the smart card module 160 has any response with regard to the data previously transmitted from the terminal device 102. For example, the processor module 110 of this embodiment may detect whether there is any new response file in the storage module 150. If the processor module 110 finds no new response file in the storage module 150, the processor module 110 determines that the smart card module 160 does not respond yet.

On the contrary, if the processor module 110 finds a new response file in the storage module 150, the processor module 110 determines that the response file contains communication protocol data generated by the smart card module 160 and intended to be received by the terminal device 102. In such case, the processor module 110 performs operation 222 to read the new response file from the storage module 150 via the memory card connection port 130, and then extracts one or more response data contained in the response file.

Then, the processor module 110 performs operation 224 to conduct subsequent processes according to the response data. For example, the processor module 110 may use a public key corresponding to the private key stored in the smart card module 160 to decrypt the response data so as to conduct identification authentication, data verification, or other procedures, thereby completing the data exchange procedure between the terminal device 102 and the smart card module 160. In operations, the processor module 110 may combine response data extracted from multiple response files before conducting the subsequent process.

In one embodiment, the processor module 110 periodically performs the operation 220 to check whether there is any new response file in the storage module 150.

In another embodiment, the processor module 110 performs the operation 220 only within a predetermined period after the end of the operation 206. If the protocol converting circuit 170 does not timely write the response file into the storage module 150 within the predetermined period, the processor module 110 determines that the smart card module 160 is time out, and thus terminates the data exchange procedure with the smart card module 160 to improve the security level in terms of data transmission.

As can be seen from the foregoing descriptions, the terminal device 102 utilizes the storage module 150 and the protocol converting circuit 170 as intermediate media to communicate data with the smart card module 160, without installing and using the driver program of the smart card module 160. In this way, the smart card module 160 can communicate data with various terminal devices of different operating systems without the use of traditional driver programs. This is beneficial to the promotion of various applications of the smart card modules.

Figure 3:
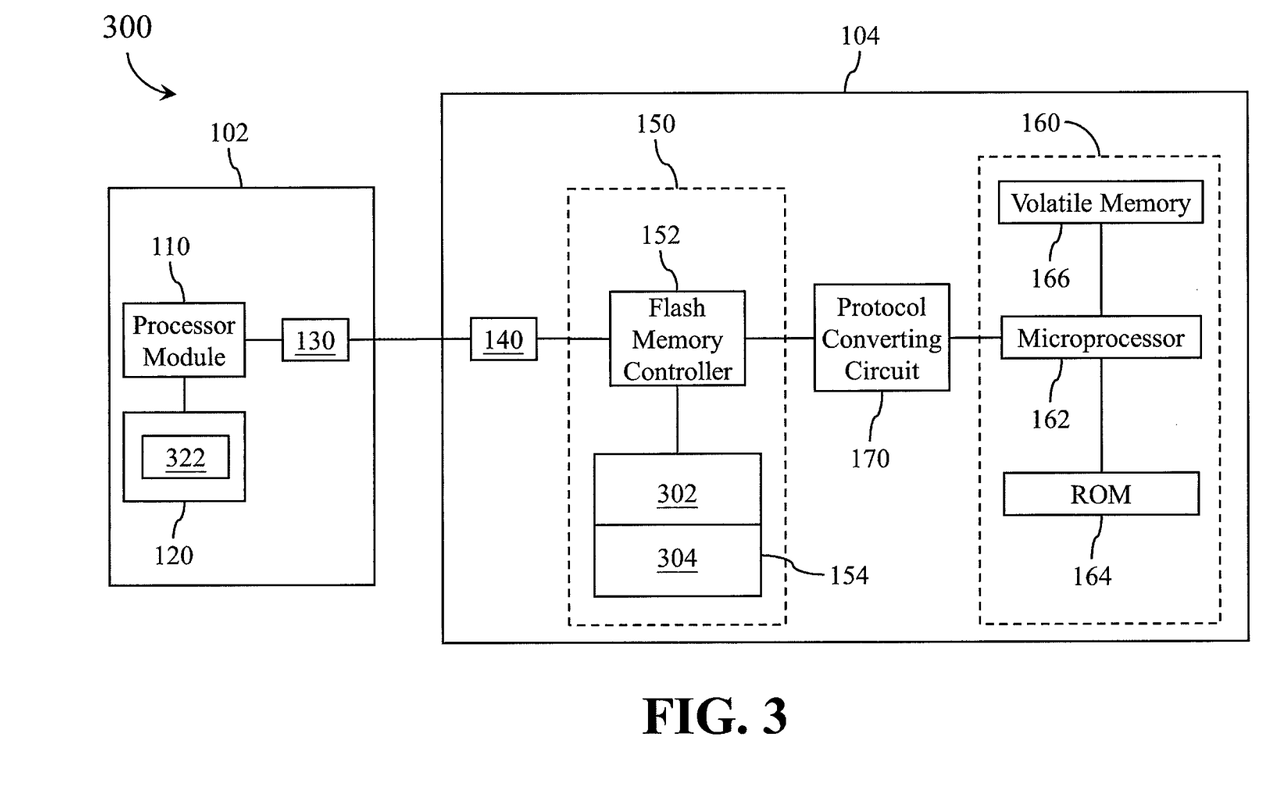
FIG. 3 is a simplified functional block diagram of a data security authentication system according to another example embodiment.

FIG. 3 is a simplified functional block diagram of a data security authentication system 300 according to another example embodiment. In the storage module 150 of the data security authentication system 300, the storage space of the flash memory module 154 is divided into a specific storage section 302 and a general data section 304. The specific storage section 302 is utilized as a data exchanging medium between the terminal device 102 and the protocol converting circuit 170, and the general data section 304 is utilized as a normal data storage space of the storage module 150. The specific storage section 302 and the general data section 304 may be allocated in different physical storage areas, such as different memory blocks, or may be allocated in different logical storage areas, such as different file folders.

In the data security authentication system 300, in order to cooperate with the storage space divisions of the flash memory module 154, a computer application program 322 of the terminal device 102 and the protocol converting circuit 170 of the multi-function memory card 104 may operate slightly different from that of the above embodiment. The operations of the data security authentication system 300 will be described further with reference to FIG. 4.

Figure 4:
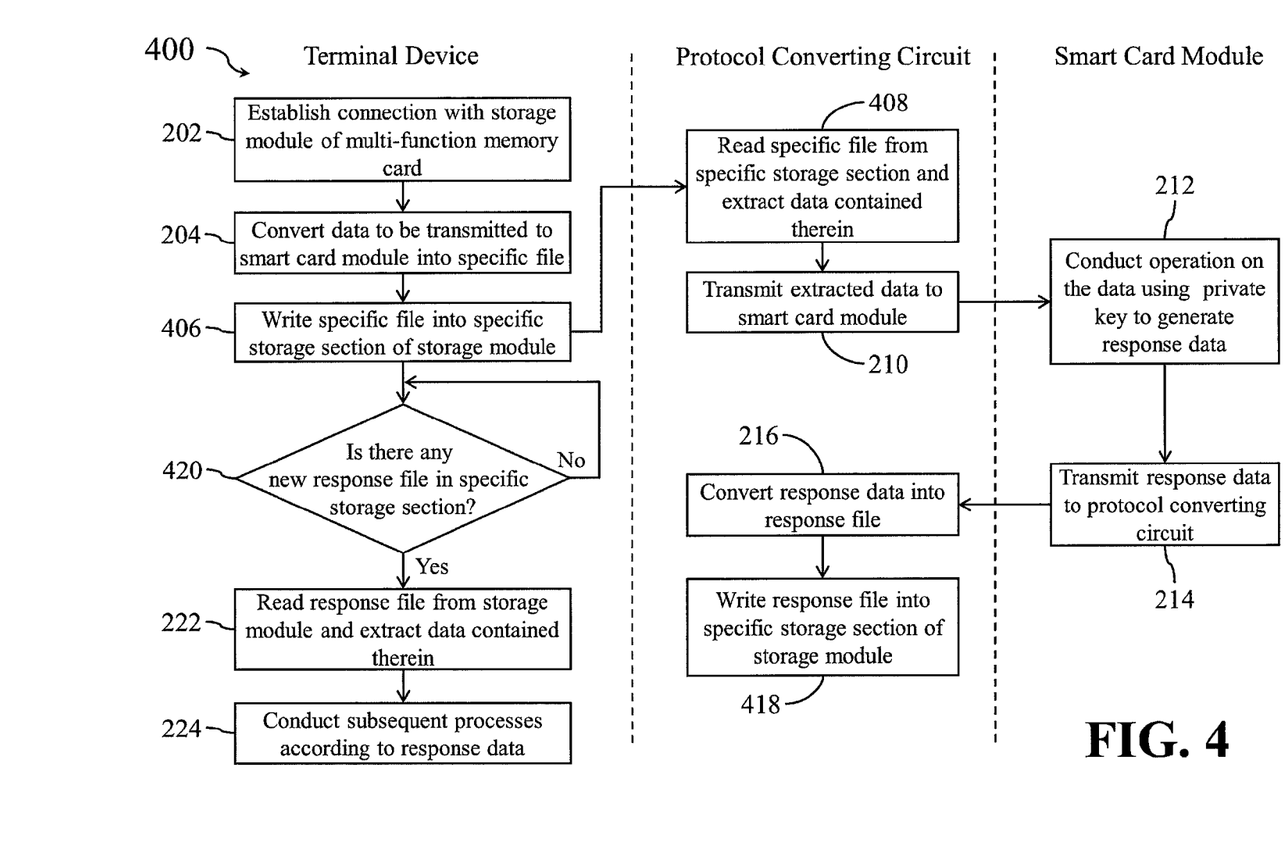
FIG. 4 is a simplified flowchart illustrating a method for communicating data between a smart card module and a terminal device in accordance with a second example embodiment.

FIG. 4 is a simplified flowchart 400 illustrating a method for communicating data between the smart card module 160 and the terminal device 102 in accordance with a second example embodiment. Many operations in the flowchart 400 are the same as those in the flowchart 200. For the sake of brevity, the difference between the flowchart 400 and the flowchart 200 will be described in the following.

Similar to the above embodiment, when the memory card interface 140 of the multi-function memory card 104 is connected to the memory card connection port 130 of the terminal device 102, the terminal device 102 performs the operation 202 to establish connections with the storage module 150 of the multi-function memory card 104 and conduct a device initiation procedure by executing the built-in common driver program of memory cards. Accordingly, the computer application program 322 in the terminal device 102 needs not to act as the driver program of the memory card. When the memory card interface 140 is connected to the memory card connection port 130, the processor module 110 of the terminal device 102 executes the computer application program 322 to enable the terminal device 102 to perform other operations in the left portion of the flowchart 400.

In the embodiment of FIG. 4, the processor module 110 performs operation 406 after the operation 204 to write the specific file into the specific storage section 302 of the storage module 150 via the memory card connection port 130 and the memory card interface 140. In this embodiment, if the file to be written into the storage module 150 by the processor module 110 is a common file that does not contain communication protocol data to be transmitted from the terminal device 102 to the smart card module 160, the processor module 110 would not specify the destination address to which the file should be written. When the terminal device 102 requests to write a file into the storage module 150, the flash memory controller 152 decides a destination address for recording the file according to the instruction of the processor module 110. If the processor module 110 instructs to record the file in the specific storage section 302 of the storage module 150, the flash memory controller 152 writes the file into the specific storage section 302. If the processor module 110 does not specify the destination address for recording the file, the flash memory controller 152 writes the file into the general data section 304. Accordingly, the flash memory controller 152 of this embodiment needs not to check the filename and/or extension of the file to be written, nor to further examine the content or header of the file.

In one embodiment, each time the flash memory controller 152 writes a file into the flash memory module 154, the flash memory controller 152 notifies the protocol converting circuit 170 of the physical address in which the file is stored. Each time the protocol converting circuit 170 receives the physical address transmitted from the flash memory controller 152, the protocol converting circuit 170 examines whether the physical address is within the specific storage section 302. If the protocol converting circuit 170 finds that the physical address is within the general data section 304, it means that the current writing operation of the terminal device 102 simply intends to write a common file into the general data section 304, not to transmit data to the smart card module 160. Accordingly, the protocol converting circuit 170 will not read the content of the file stored in the physical address via the flash memory controller 152.

On the contrary, if the protocol converting circuit 170 finds that the physical address is within the specific storage section 302, the protocol converting circuit 170 determines that the file currently written into the specific storage section 302 by the processor module 110 is a specific file containing communication protocol data to be transmitted from the terminal device 102 to the smart card module 160. In such case, the protocol converting circuit 170 performs operation 408 to issue a read request to the flash memory controller 152 for reading data stored in the specific physical address, so that the protocol converting circuit 170 can retrieve the specific file from the specific storage section 302 of the storage module 150, and then extract data from the specific file.

In another embodiment, the flash memory controller 152 notifies the protocol converting circuit 170 of the physical address in which the file is stored only if the file is recorded in the specific storage section 302 of the flash memory module 154. In this case, once the protocol converting circuit 170 receives the physical address transmitted from the flash memory controller 152, the protocol converting circuit 170 determines that the file currently written into the flash memory module 154 by the processor module 110 is a specific file containing communication protocol data generated by the terminal device 102 and intended to be received by the smart card module 160. Then, the protocol converting circuit 170 proceeds to the operation 408.

As can be seen from the foregoing descriptions, based on merely the physical address transmitted from the flash memory controller 152, the protocol converting circuit 170 is capable of determining whether the file currently written into the flash memory module 154 by the processor module 110 contains communication protocol data to be transmitted from the terminal device 102 to the smart card module 160. That is, the protocol converting circuit 170 needs not to check the content or header of each file written into the flash memory module 154 by the processor module 110. As a result, the computing resource required for the protocol converting circuit 170 to achieve the above determination is very low.

Then, the protocol converting circuit 170 performs operation 210 to transmit extracted data to the smart card module 160.

In the embodiment of FIG. 4, the protocol converting circuit 170 performs operation 418 after the operation 216 to write the generated response file into the specific storage section 302 of the storage module 150.

In addition, the processor module 110 of the terminal device 102 intermittently performs operation 420 after the operation 406. The processor module 110 may periodically or aperiodically examine the content stored in the specific storage section 302 of the storage module 150 to detect whether the smart card module 160 has any response with regard to the data previously transmitted from the terminal device 102. For example, the processor module 110 of this embodiment may detect whether there is any new response file in the specific storage section 302. If the processor module 110 finds no new response file in the specific storage section 302, the processor module 110 determines that the smart card module 160 does not respond yet.

On the contrary, if the processor module 110 finds a new response file in the specific storage section 302, the processor module 110 determines that the response file contains communication protocol data generated by the smart card module 160 and intended to be received by the terminal device 102. In such case, the processor module 110 performs operation 222 to read the new response file from the specific storage section 302 via the memory card connection port 130, and then extracts one or more response data contained in the response file.

In one embodiment, the processor module 110 periodically performs the operation 420 to check whether there is any new response file in the specific storage section 302.

In another embodiment, the processor module 110 performs the operation 420 only within a predetermined period after the end of the operation 406. If the protocol converting circuit 170 does not timely write the response file into the specific storage section 302 of the storage module 150 within the predetermined period, the processor module 110 determines that the smart card module 160 is time out, and thus terminates the data exchange procedure with the smart card module 160 to improve the security level in terms of data transmission.

The terminal device 102 and the protocol converting circuit 170 utilize the specific storage section 302 of the storage module 150 as an intermediate medium for data exchanging. As a result, the efficiency of checking contents stored in the storage module 150 conducted by the processor module 110 and the protocol converting circuit 170 can be improved. The above architecture is more beneficial to reducing the file amounts needed to be examined by the processor module 110 and the protocol converting circuit 170 in the applications where the storage module 150 has a huge storage capacity.

Figure 5:
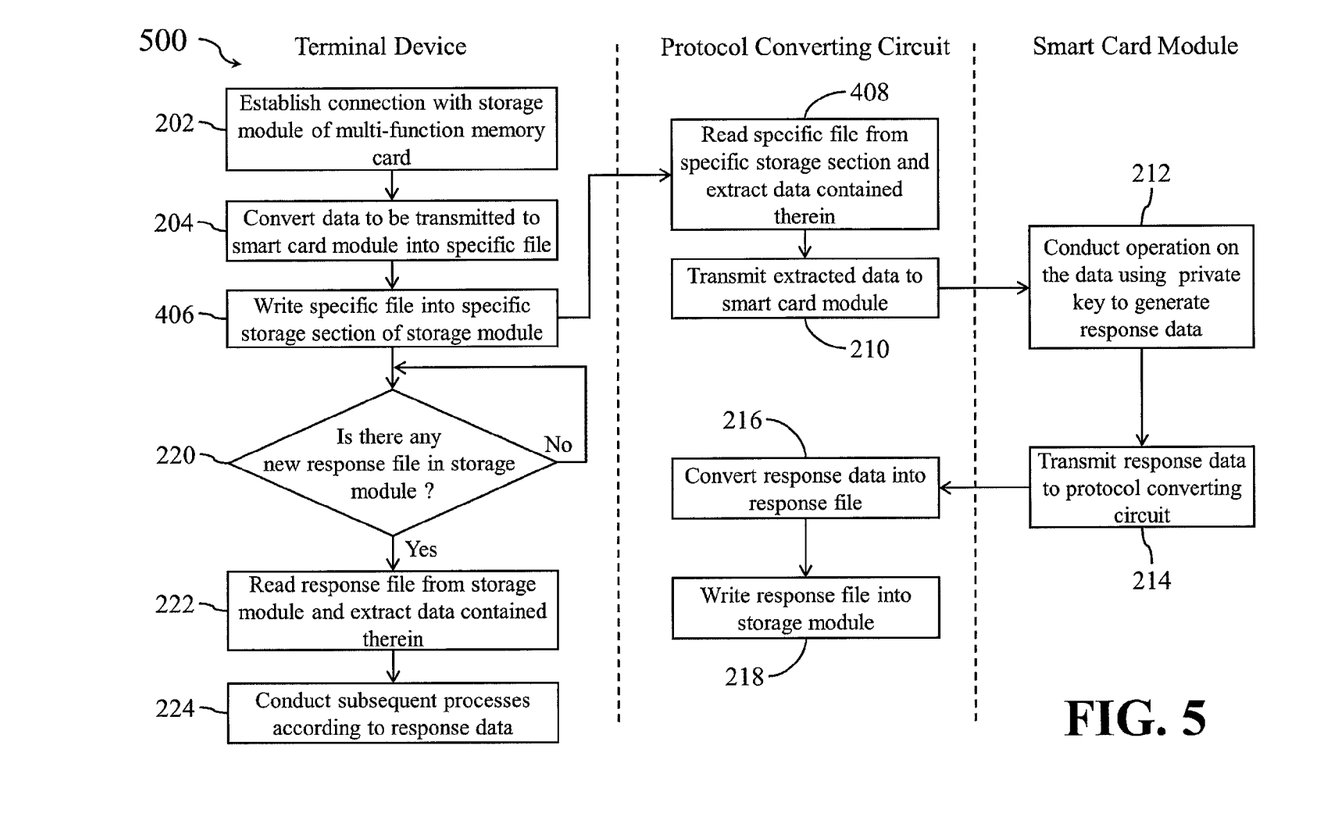
FIG. 5 is a simplified flowchart illustrating a method for communicating data between a smart card module and a terminal device in accordance with a third example embodiment.

In the embodiment of FIG. 4, both the terminal device 102 and the protocol converting circuit 170 write files related to the smart card module 160 into the specific storage section 302 of the storage module 150. But this is merely an example rather than a restriction to the practical implementations. For example, in an embodiment illustrated by a flowchart 500 of FIG. 5, the processor module 110 performs the operation 406 after the operation 204, but intermittently performs the operation 220 after the operation 406. In addition, when the protocol converting circuit 170 finds that there is a new specific file added to the specific storage section 302 of the storage module 150, the protocol converting circuit 170 performs the operation 408, but performs the operation 218 after the operation 216.

Figure 6:
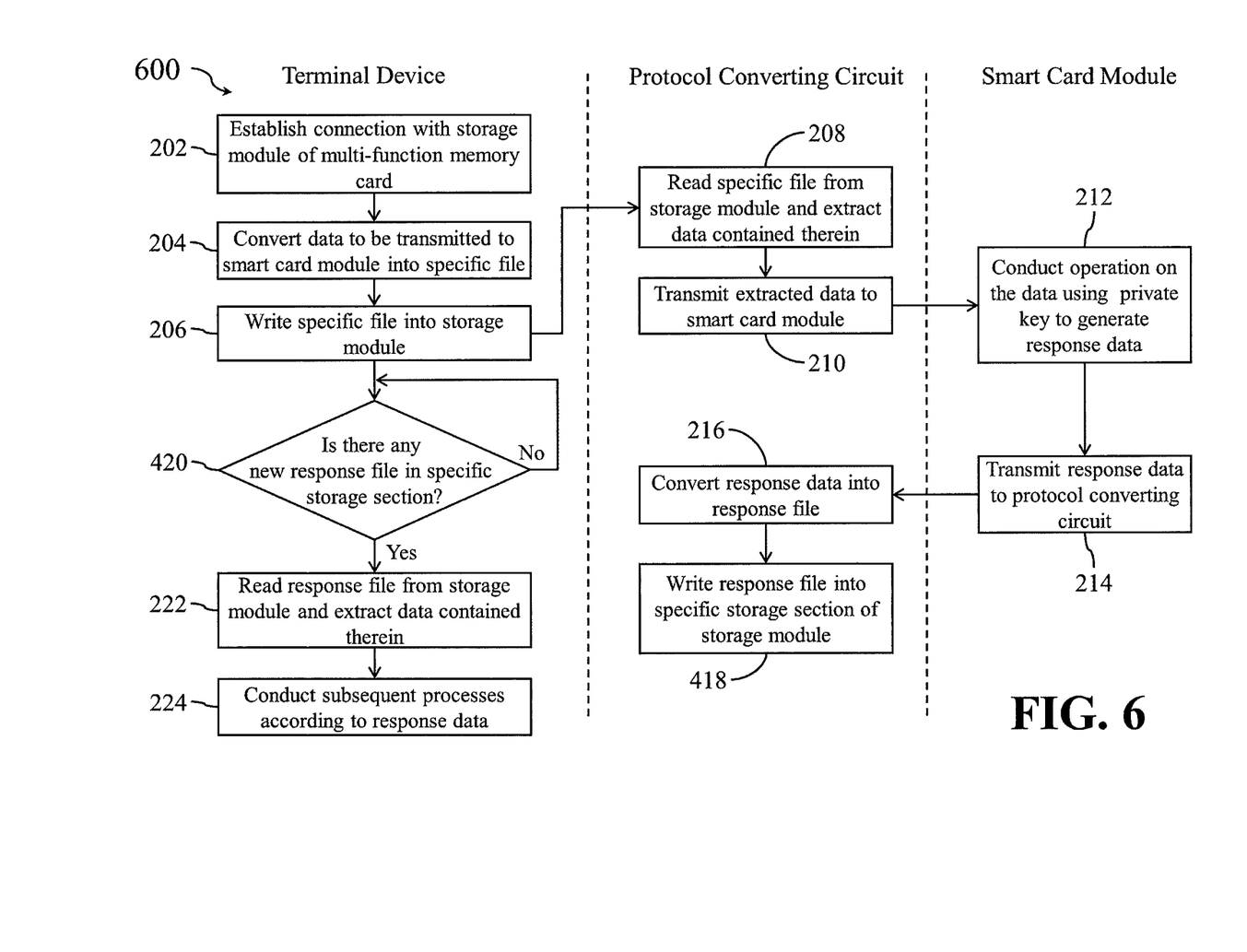
FIG. 6 is a simplified flowchart illustrating a method for communicating data between a smart card module and a terminal device in accordance with a fourth example embodiment.

In yet another embodiment illustrated by a flowchart 600 of FIG. 6, the processor module 110 performs the operation 206 after the operation 204, but intermittently performs the operation 420 after the operation 206. In addition, when the protocol converting circuit 170 finds that there is a new specific file added to the storage module 150, the protocol converting circuit 170 performs the operation 208, but performs the operation 418 after the operation 216.

In an embodiment where the memory card connection port 130 of the terminal device 102, the memory card interface 140 of the multi-function memory card 104, and the flash memory controller 152 all support SDIO (secure digital input/output) communication protocol or other similar protocols, the protocol converting circuit 170 may notify the processor module 110 via the flash memory controller 152 and the memory card interface 140 after writing the response file into the storage module 150 (i.e., the operation 218 or 418). In such situation, the processor module 110 may omit the operation of checking the content stored in the storage module 150.

Figure 7:
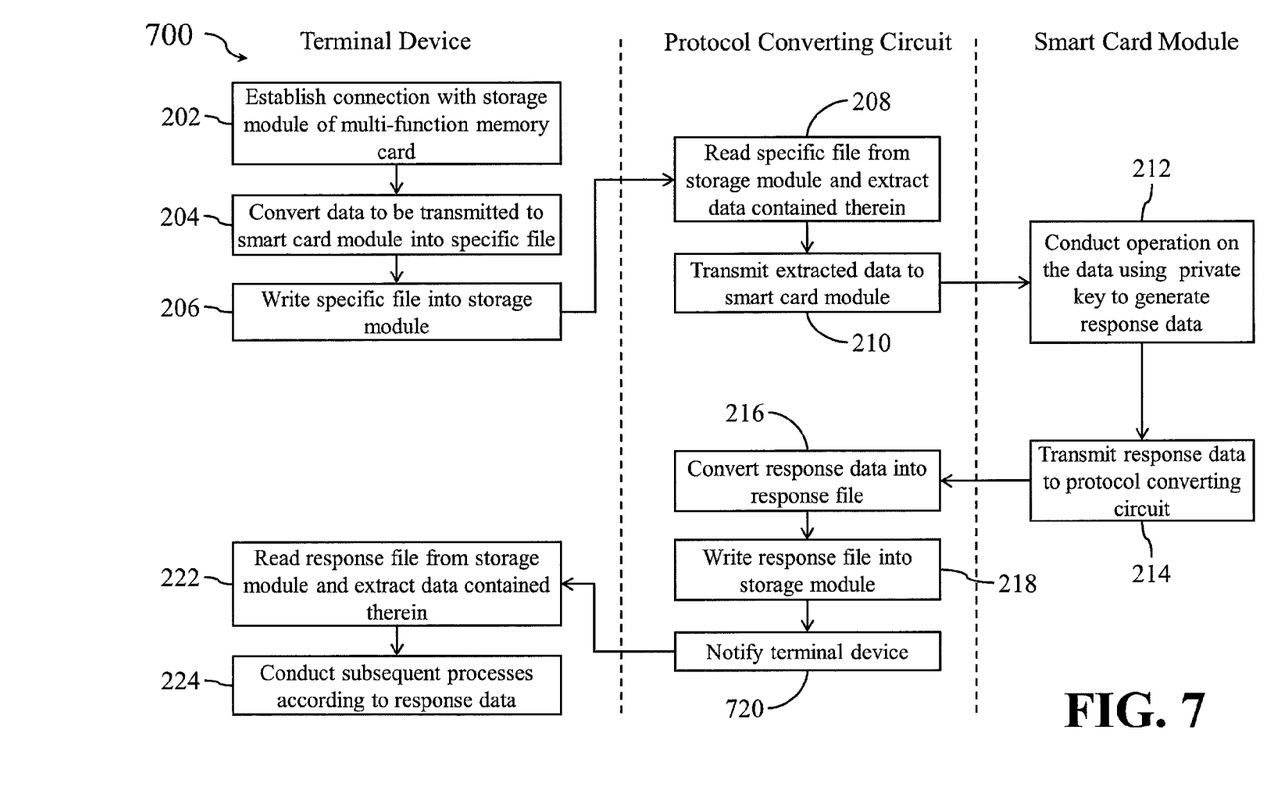
FIG. 7 is a simplified flowchart illustrating a method for communicating data between a smart card module and a terminal device in accordance with a fifth example embodiment.

For example, in an embodiment illustrated by a flowchart 700 of FIG. 7, the processor module 110 performs the operation 206 after the operation 204, but would not perform the operation 220 or 420 after the operation 206. However, the protocol converting circuit 170 performs operation 720 after the operation 218 to notify the processor module 110 via the flash memory controller 152 and the memory card interface 140 of that the response file has been written into the storage module 150 by the protocol converting circuit 170, so that the processor module 110 may proceed to the operation 222 immediately.

Figure 8:
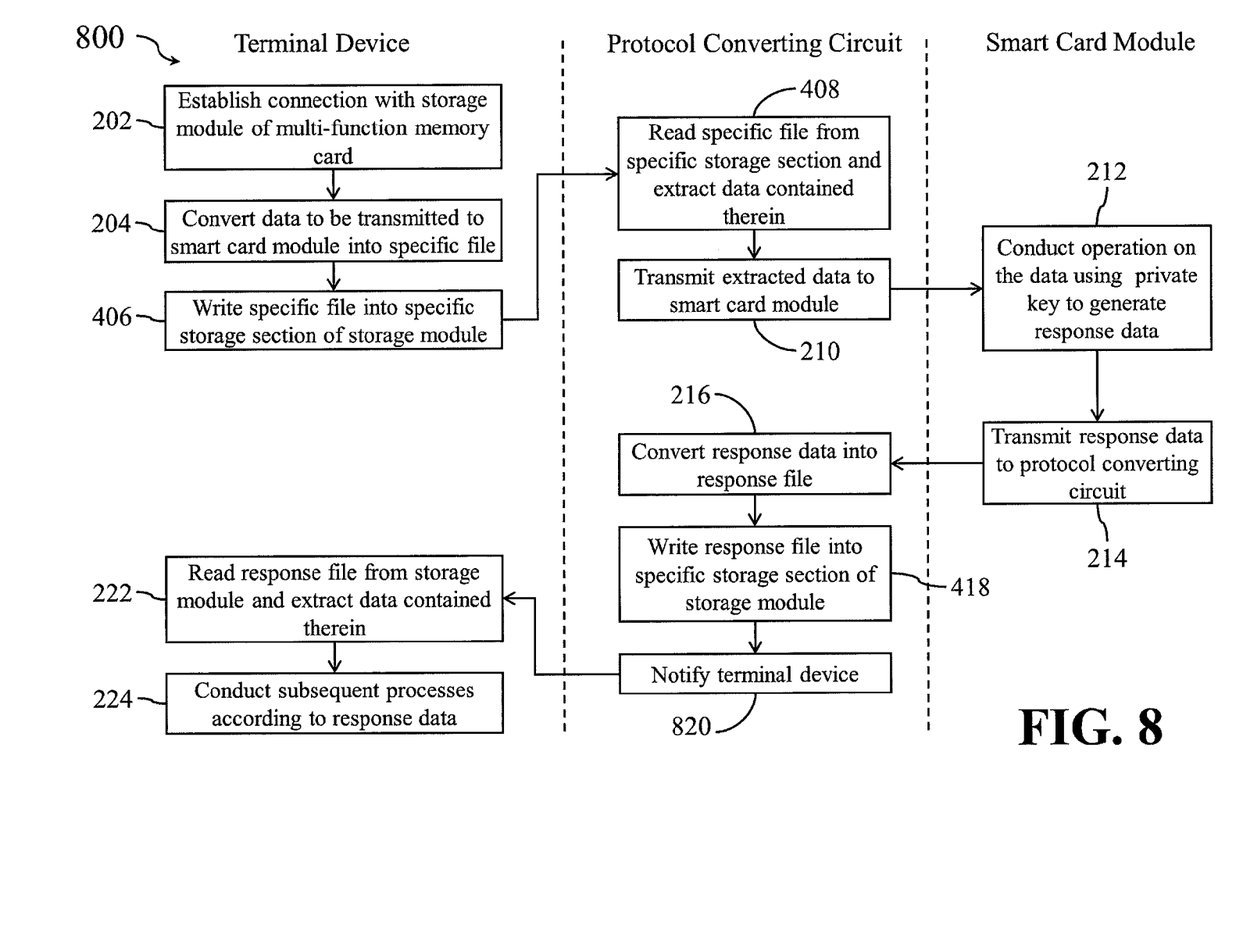
FIG. 8 is a simplified flowchart illustrating a method for communicating data between a smart card module and a terminal device in accordance with a sixth example embodiment.

In yet another embodiment illustrated by a flowchart 800 of FIG. 8, the processor module 110 performs the operation 406 after the operation 204, but would not perform the operation 220 or 420 after the operation 406. However, the protocol converting circuit 170 performs operation 820 after the operation 418 to notify the processor module 110 via the flash memory controller 152 and the memory card interface 140 of that the response file has been written into the specific storage section 302 of the storage module 150 by the protocol converting circuit 170, so that the processor module 110 may proceed to the operation 222 immediately.

In operations, the embodiments of FIG. 7 and FIG. 8 are capable of further expediting the data exchanging procedure between the terminal device 102 and the smart card module 160.

In one embodiment where the memory card connection port 130, the memory card interface 140, and the flash memory controller 152 all support SDIO communication protocol or other similar protocols, the processor module 110 may notify the protocol converting circuit 170 via the memory card interface 140 and the flash memory controller 152 after the operation 206 or 406. In such situation, the protocol converting circuit 170 may directly proceed to the operation 208 or 408 immediately.

The protocol converting circuit 170 in any of the previous embodiments may record the data exchanged between the terminal device 102 and the smart card module 160 in the storage module 150 to establish a data exchanging history so as to provide more functionalities to the user, such as inquiring of prior transaction amount, transaction time, transaction subjects, transaction parties, number of times of authentication, or authentication time. Therefore, the disclosed multi-function memory card 104 may be applied in many environments where the data security is a concern, such as identity authentication, door access control, e-wallet, system log-in, certificate verification, digital signature, file management, e-ticket, e-transaction certificate, or account management.

As can be seen from the foregoing descriptions, by executing the computer application program 122 or 322, the terminal device 102 is enabled to utilize the storage module 150 as an intermediate medium for exchanging data with the protocol converting circuit 170 via the memory card connection port 130, thereby achieving indirect data exchange between the terminal device 102 and the smart card module 160. As a result, the terminal device 102 is enabled to achieve a PKI-based data security mechanism with the smart card module 160 without the need of connecting to an external smart card reader, nor the need of installing corresponding driver program of the smart card reader.

For many terminal devices, especially for portable terminal devices (such as mobile phones, notebook computers, tablet computers, or e-books), if any of the above-disclosed methods is employed, a built-in smart card reader is no longer needed and the USB connection ports can also be eliminated to further reduce the volume of the terminal device. In addition, since the user of the portable terminal device no longer needs to carry a USB smart card reader for accessing the smart card module, the inconvenience for the use of the smart card module of the prior art is also eliminated.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data security authentication system comprising:
a terminal device comprising:
a memory card connection port; and a processor module, coupled with the memory card connection port, for converting one or more data into one or more specific files and writing the one or more specific files into a storage module via the memory card connection port; the one or more specific files written to a specific physical address if it has a predetermined filename or extension and to other physical address if it doesn't have a predetermined filename or extension; and
a multi-function memory card comprising:
a memory card interface for coupling with the memory card connection port; the storage module, coupled with the memory card interface, for storing the one or more specific files; a protocol converting circuit, coupled with the storage module, for retrieving the one or more specific files from the storage module based on the filename or extension which is associated with the specific physical address and extracting data contained in the one or more specific files; and
a smart card module, coupled with the protocol converting circuit, for conducting an operation on extracted data from the protocol converting circuit using a private key to generate one or more response data and transmitting the one or more response data to the protocol converting circuit;
wherein the protocol converting circuit converts the one or more response data into one or more response files and writes the one or more response files into the storage module, then the processor module reads the one or more response files from the storage module via the memory card connection port and extracts the response data contained in the one or more response files.

2. A multi-function memory card comprising:
a memory card interface for coupling with a memory card connection port of a terminal device;

a storage module, coupled with the memory card interface, for storing one or more specific files transmitted from the terminal device when the memory card interface is coupled with the memory card connection port; the one or more specific files written to a specific physical address if it has a predetermined filename or extension and to other physical address if it doesn't have a predetermined filename or extension;

a protocol converting circuit, coupled with the storage module, for retrieving the one or more specific files from the storage module based on the filename or extension which is associated with the specific physical address and extracting data contained in the one or more specific files; and a smart card module, coupled with the protocol converting circuit, for conducting an operation on extracted data from the protocol converting circuit using a private key to generate one or more response data and transmitting the one or more response data to the protocol converting circuit;

wherein the protocol converting circuit converts the one or more response data into one or more response files and writes the one or more response files into the storage module so that the one or more response files are accessible by the terminal device.

3. The multi-function memory card of claim 2, wherein each of the one or more response files has a predetermined filename or extension assigned by the protocol converting circuit.

4. The multi-function memory card of claim 2, wherein the storage module comprises:

a memory controller, coupled with the protocol converting circuit, for controlling accessing of the storage module and notifying the protocol converting circuit of physical address of the one or more specific files when the terminal device writes the one or more specific files into the storage module.

5. The multi-function memory card of claim 2, wherein the storage module is pre-stored with a computer application program, when the storage module is connected to the memory card connection port of the terminal device, the computer application program is automatically installed to the terminal device, enabling the terminal device to perform data communication operation with the smart card module via the memory card connection port, the data communication operation comprising:

converting one or more data to be transmitted to the smart card module into the one or more specific files;

writing the one or more specific files into the storage module via the memory card connection port so that the one or more specific files are accessible by the protocol converting circuit;

retrieving the one or more response files from the storage module via the memory card connection port; and extracting the response data contained in the one or more response files.

6. The multi-function memory card of claim 2, wherein the storage module comprises:

a memory module comprising a specific storage section; and a memory controller, coupled with the memory card interface, the memory module, and the protocol converting circuit, for controlling accessing of the memory module and notifying the protocol converting circuit of physical address of the one or more specific files when the terminal device writes the one or more specific files into the specific storage section.

7. The multi-function memory card of claim 6, wherein the protocol converting circuit writes the one or more response files into the specific storage section via the memory controller.

8. The multi-function memory card of claim 2, wherein the storage module comprises:

a memory module comprising a specific storage section; and a memory controller, coupled with the memory card interface, the memory module, and the protocol converting circuit, for controlling accessing of the memory module;

wherein the protocol converting circuit writes the one or more response files into the specific storage section via the memory controller.

9. The multi-function memory card of claim 8, wherein the storage module is pre-stored with a computer application program, when the memory card interface is connected to the memory card connection port of the terminal device, the computer application program is executed by a processor module of the terminal device, enabling the terminal device to perform data communication operation with the smart card module via the memory card connection port, the data communication operation comprising:

converting one or more data to be transmitted to the smart card module into the one or more specific files;

writing the one or more specific files into the specific storage section via the memory card connection port so that the one or more specific files are accessible by the protocol converting circuit;

retrieving the one or more response files from the specific storage section via the memory card connection port; and extracting the response data contained in the one or more response files.

10. A computer program product, stored in a non-transitory computer readable medium, enabling a terminal device to perform data communication operation with a smart card module via a memory card connection port, the data communication operation comprising:

converting one or more data to be transmitted to the smart card module into one or more specific files;

writing the one or more specific files into a storage module of a multi-function memory card via the memory card connection port; the one or more specific files written to a specific physical address if it has a predetermined filename or extension and to other physical address if it doesn't have a predetermined filename or extension;

retrieving a response file from the storage module based on the filename or extension which is associated with the specific physical address via the memory card connection port; and extracting response data contained in the response file, wherein the response data is generated by the smart card module using a private key.

11. The computer program product of claim 10, wherein the data communication operation comprises:

intermittently checking content stored in the storage module to detect whether there is any new response file in the storage module.

12. The computer program product of claim 10, wherein the operation of writing the one or more specific files into the multi-function memory card comprising:

writing the one or more specific files into a specific storage section of the storage module.

13. The computer program product of claim 12, wherein the operation of retrieving the response file comprising:

retrieving the response file from the specific storage section of the storage module.

14. The computer program product of claim 10, wherein the operation of retrieving the response file comprising:
  retrieving the response file from a specific storage section of the storage module.

15. The computer program product of claim 10, wherein the response file is a file having a predetermined filename or extension assigned by the protocol converting circuit.

* * * * *